(12) United States Patent
Billaud

(10) Patent No.: US 8,674,872 B2
(45) Date of Patent: Mar. 18, 2014

(54) METHOD FOR INCREASING THE TIME FOR ILLUMINATION OF TARGETS BY A SECONDARY SURVEILLANCE RADAR

(75) Inventor: Philippe Jean Patrick Billaud, Fontenay (FR)

(73) Assignee: Thales, Neuilly sur Seine (FR)

( * ) Notice: Subject to any disclaimer, the term of this patent is extended or adjusted under 35 U.S.C. 154(b) by 92 days.

(21) Appl. No.: 13/237,810

(22) Filed: Sep. 20, 2011

(65) Prior Publication Data

US 2012/0068878 A1    Mar. 22, 2012

(30) Foreign Application Priority Data

Sep. 21, 2010   (FR) ...................................... 10 03751

(51) Int. Cl.
*G01S 13/78* (2006.01)
*G01S 13/44* (2006.01)

(52) U.S. Cl.
USPC .................................. 342/39; 342/37; 342/45

(58) Field of Classification Search
USPC .......................................................... 342/39
See application file for complete search history.

(56) References Cited

U.S. PATENT DOCUMENTS

| | | | | |
|---|---|---|---|---|
| 3,427,621 A | * | 2/1969 | Brunner | 342/39 |
| 4,027,307 A | * | 5/1977 | Litchford | 342/32 |
| 4,376,937 A | * | 3/1983 | Cohen | 342/43 |
| 4,384,290 A | * | 5/1983 | Pierrot et al. | 342/43 |
| 4,897,659 A | * | 1/1990 | Mellon | 342/45 |
| 4,910,521 A | * | 3/1990 | Mellon | 342/45 |
| 5,072,224 A | * | 12/1991 | Verbeke et al. | 342/152 |
| 5,218,365 A | | 6/1993 | Woodall | |
| 5,302,953 A | * | 4/1994 | Pierre et al. | 342/37 |
| 2008/0238758 A1 | | 10/2008 | Billaud et al. | |
| 2011/0090053 A1 | | 4/2011 | Soula et al. | |

FOREIGN PATENT DOCUMENTS

| | | |
|---|---|---|
| EP | 0053512 A1 | 6/1982 |
| FR | 2918804 A1 | 1/2009 |
| WO | 2010049284 A1 | 5/2010 |

* cited by examiner

*Primary Examiner* — Matthew M Barker
(74) *Attorney, Agent, or Firm* — Baker Hostetler LLP

(57) ABSTRACT

A secondary surveillance radar with rotating antenna, configured for transmitting interrogations in S or IFF mode and processing the responses to these interrogations. The radar includes an antenna having a lobe with three channels, a Sum channel, a Difference channel and a Control channel, whose transmission means are configured for transmitting interrogation messages over the Sum and Difference channels and whose reception and processing means are configured so as to carry out, aside from conventional detections by the Sum channel, detections by the Difference channel of the responses from the aircraft having been subjected to interrogation by this same channel. The radar also includes means for Space-Time Management configured for generating interrogation messages and determining whether a given message is to be transmitted by the Sum channel, by the Difference channel or by the two channels simultaneously and controlling its transmission by the corresponding transmission channel.

4 Claims, 11 Drawing Sheets

2_A Limitation in the exchanges at transmission

2_B Limitation in the exchanges on reception

4_A Limitation in the exchanges at transmission

4_B Limitation in the exchanges on reception

METHOD FOR INCREASING THE TIME FOR ILLUMINATION OF TARGETS BY A SECONDARY SURVEILLANCE RADAR

CROSS-REFERENCE TO RELATED APPLICATION

This application claims priority to foreign French patent application No. FR 1003751, filed on Sep. 21, 2010, the disclosure of which is incorporated by reference in its entirety.

FIELD OF THE INVENTION

The invention relates to the general field of secondary surveillance radar systems. It relates, more particularly, to the process of interrogation of aircraft by a secondary surveillance radar of the monopulse type, in particular for interrogations in S mode or in IFF mode.

BACKGROUND

The antennas that equip current secondary surveillance radar (SSR) systems are generally large antennas (4 to 9 m wide) which conventionally possess 3 transmission/reception channels: a channel referred to as "Sum channel" or "Σ channel", a channel referred to as "Difference channel" or "Diff channel" or else "Δ channel", and a complementary channel referred to as "Control channel" or "Cont channel" or else "Ω channel". By virtue of their design, these antennas exhibit a virtually perfect similarity between their transmission characteristics (at 1030 MHz) and reception characteristics (at 1090 MHz). These antennas advantageously allow transmissions to take place over one or other of these channels.

It is common practice for the Σ channel to be the only channel used by the radar to implement the exchanges between the transponders on board aircraft and itself, notably the exchanges in S mode or in IFF mode. The Δ channel is on the other hand used simply in reception to implement the error function allowing the true azimuth of the transponder in question to be precisely determined. With regard to the Ω channel, this allows the signals received by the side lobes of the Σ channel to be identified and, consequently, to be ignored (side-lobe suppression function or "SLS").

Furthermore, with regard to the operation of these radar systems in S mode or in IFF mode, the standards defined by the International Civil Aviation Organization ("ICAO"), notably in Annex 10, Volume 4, together with those corresponding to the NATO standard STANAG 4193 (1st part) define the signals to be sent out in order to obtain the response from the transponder of an aircraft in the main lobe of the interrogator. It is recalled here that the S mode corresponds to a dedicated mode of interrogation related to civilian aircraft, whereas the IFF mode is a dedicated mode of interrogation relating to military aircraft.

In S mode, the secondary surveillance radar operates in tracking mode, namely where the position of a given aircraft (in azimuth azimuth and distance), for a given antenna rotation, is determined, predicted, by extrapolation of its previous position determined during the detection of this aircraft on the preceding rotation. In IFF mode, the position of a given aircraft (in azimuth and distance), for a given antenna rotation, can be supplied either as in S mode, but also using another sensor such as the primary radar or an optronic sensor for example.

The 3 antenna channels are normally used as follows:
a) with regard to the transmissions (at 1030 MHz):
the Σ channel is dedicated to the interrogation via the main lobe of the antenna, in S mode or in IFF mode, of any transponder (i.e. of any aircraft) localized within the area covered by the main lobe.
the channel "Cont", or Ω, is employed in order to block the responses from the transponders localized within a region outside of the main lobe and which are however capable of receiving the interrogations transmitted over the Σ channel by the side lobes of this channel. For this purpose, an interrogation signal is transmitted by the channel "Cont" (SLS channel interrogation function or "ISLS").
b) with regard to the receptions (at 1090 MHz):
the Σ channel is dedicated to the detection and to the decoding via the main lobe of the antenna, in S mode or in IFF mode, of the responses from any transponder (i.e. from any aircraft) localized within the area covered by the main lobe.
the Ω channel is employed in order to reject the responses of the transponders localized within a region outside of the main lobe and whose responses are received over the Σ channel, by the side lobes of this channel (SLS channel response suppression function or "RSLS").
the Δ channel is used for the Monopulse processing, in order to precisely determine within the main lobe from which transponder the response originates and also for implementing the "RSLS" function.

It should be noted that in the application of the OACI and STANAG standards, the ISLS function is normally implemented by aircraft by considering the received radar signals. This results in the transponders necessarily responding if, for the azimuth in question:

$$G_{Sum} \cdot P_{Interrogation} - G_{Cont} \cdot P_{ISLS} \geq 9 \text{ dB}$$

where G is the gain of the antenna at the azimuth of the aircraft and P the power of the interrogations transmitted over Sum (Σ) and Control (Ω). The transponders do not respond if:

$$G_{Sum} \cdot P_{Interrogation} - G_{Cont} \cdot P_{ISLS} < 0 \text{ dB}$$

Between the 2 thresholds (0 dB and 9 dB) and depending on the standards applied, the transponder may or may not respond. Considering the differences in between 0 dB and 9 dB, this is commonly referred to as a "grey area".

It should also be noted that, in a similar fashion, the RSLS function is implemented by the radar, by considering the signals received from the transponder in question.

The result of this is that the responses received for the azimuth in question are considered as received by the side lobes of the Sum channel and consequently eliminated, if:

$$G_{Sum} - G_{Cont} \leq \text{Threshold\_RSLS}_{Cont}$$

A further consequence is that the responses received for the azimuth in question are considered as coming from transponders localized outside of the reception arc allowing the monopulse processing and consequently eliminated, if:

$$G_{Sum} - G_{Cont} \leq \text{Threshold\_RSLS}_{Diff}$$

Consequently, the effective interrogation arc of the radar (1030 MHz), which corresponds to the region of space within which the transponder is capable of responding, is therefore limited:
for nearby aircraft, by implementing the ISLS function (described hereinabove);
for distant aircraft, by the penetration of the sensitivity threshold of the receiver of the transponder by the interrogation signals coming from the radar, which penetration is defined for the azimuth in question, by:

$$G_{Sum} \cdot P_{int\ errogation} - Losses \geq Sensitivity\_Threshold\_Transponder,$$

the Losses mentioned being mainly due to the losses resulting from the propagation of the signals between the radar and the aircraft.

It should be noted that the formula stated hereinabove is a simplified formula intended to highlight the role of the Gain of the antenna of the radar.

Similarly, the effective reception arc (1090 MHz) of the radar, which corresponds to the area within which the responses from the transponder will be processed by the radar, is on the other hand limited:

for nearby aircraft, by implementing the RSLS function (described hereinabove);

for distant aircraft, by the penetration of the sensitivity threshold of the receiver of the transponder by the interrogation signals coming from the radar, which penetration is defined for the azimuth in question, by:

$$G_{Sum} \cdot P_{Responses} - Losses \geq Sensitivity\_Threshold\_Transponder.$$

For distant aircraft, the above considerations in practice often lead, in the context of a long-range radar configuration, to the signals only being used both by the transponder and by the radar when the gain G of the antenna for the azimuth of the target with respect to the maximum gain of the antenna is such that:

$$G_{max} - G \leq 4\ dB$$

Thus, in particular for operation in S mode or in IFF mode, the operational mode of the various channels of the secondary surveillance radar described previously, as regards the exchanges of information between the radar and the various transponders, leads to limitations in the use of the signals in transmission and in reception. The consequence of this is that, for a given transponder, the interrogation and response functions are limited in time to a time window defined by an angular opening corresponding to a fraction of the diagram of the $\Sigma$ channel conventionally called illumination of the target. Outside of this window, the interrogations and the responses are not valid or are not taken into consideration.

Currently, these operational limitations are turning out to be increasingly incompatible with the operational limitations supported by the secondary surveillance radar systems responsible for the control of the air traffic, such as for military radar systems responsible for the IFF identification.

Indeed, in order to satisfy the need for closer approach of aircraft necessary due to the increasing density of flights, the only solution is to make the antennas of the radar rotate with higher and higher speeds in order to reduce the dead time between two orientations of the antenna lobe along the same azimuth and consequently between two successive detections of the same aircraft thus reducing the uncertainty in the position of an aircraft between two antenna rotations. Such an increase in the antenna rotation speed results in a further reduction in the interval of time during which a secondary surveillance radar can exchange information with a given aircraft, which interval of time is again referred to as illumination time of the target in question.

Furthermore, owing also to the increasing density of aircraft flights, the secondary surveillance civilian radar systems operating in S mode are obliged to selectively manage the routes of an increasing number of aircraft and must additionally, in mode EHS in particular, allow the exchange of an increasing quantity of data with the latter, which data are denoted "commB Data Selector registers" (or "BDS registers") according to the terminology in current usage. The "BDS" are numbered according to the registers of the transponder, which registers contain the flight data. Thus, for example, the following can be differentiated: BDS40 (aircraft intention), the BDS50 (track and turn report) or again the BDS60 (heading and speed report).

For their part, military radar systems additionally require:

either a growing number of interrogations and of responses for each aircraft interrogated, in such a manner as to withstand jamming and intrusion systems that are becoming ever more sophisticated, or a continually increasing illumination time on the target, in order to pick up responses with a long response time required by the new IFF modes of identification.

These growing limitations lead to constraints that are less and less compatible with the current operation of secondary surveillance radar systems.

SUMMARY OF THE INVENTION

One aim of the invention is to solve the aforementioned problems by providing a substantial increase, even a doubling, of the illumination time of a target of a secondary surveillance radar with rotating antenna in each spatial direction. Another aim of the invention consists in providing this increase without the necessity for substantial modification of the structure of the radar and, in particular, without requiring modification of either the antenna or of the means of formation of the channels.

For this purpose, the subject of the invention is a secondary surveillance radar of the type comprising an antenna having a radiation diagram forming a Sum channel, a radiation diagram forming a Difference channel and a diagram forming a Control channel, also comprising means for generating "Sum channel" interrogation messages and ISLS "Control channel" interrogation messages and means for transmitting these messages by the Sum and Control channels, respectively, of the antenna together with means for the reception and the processing of the radio signals received by the Sum, Control and Difference channels configured for detecting the aircraft responses on the signals received by the Sum channel of the antenna and for performing monopulse processing and SLS processing on these responses using the signals received by the Difference and Control channels of the antenna.

According to the invention, the means for generating interrogation messages are configured for also generating "Difference channel" interrogation messages and the transmission means are configured for the ability to transmit these messages by the Difference channel of the antenna. The means for generating interrogation messages comprise means for managing the transmission of each interrogation message to the corresponding transmission channel. The means for the reception and the processing of the radio signals received by the Sum, Control and Difference channels are additionally configured for detecting the responses from aircraft on the signals received by the Difference channel of the antenna. The means are furthermore configured and arranged in such a manner that, for a given moment, the transactions between the radar and a given aircraft can be carried out either by the Sum channel of the antenna lobe, or by the Difference channel, or else by both channels, depending on the position of the target within the antenna lobe at the moment in question.

According to a first embodiment of the invention, the means for generating the interrogation messages being configured for the ability to simultaneously deliver two identical or separate messages to the transmission means, the transmission means comprise two separate transmission channels, one transmission channel being dedicated to the transmission of one of the messages by the Sum channel of the antenna lobe and the other being dedicated to the transmission of the other message over the Difference channel of the same antenna lobe.

According to a second embodiment of the invention, the means for generating the interrogation messages being configured for the ability to alternately deliver "Sum channel" messages and "Difference channel" messages to the transmission means, the transmission means comprise single means for transforming the message delivered into a radio signal and switching means for directing the signal produced over that of the antenna channels, Sum channel or Difference channel, which corresponds to the nature of the message delivered.

According to a third embodiment of the invention, the means for generating the interrogation messages being configured for the ability to deliver, alternately or simultaneously, identical "Sum channel" messages and "Difference channel" messages to the transmission means, the transmission means comprise single means for transforming the message delivered into a radio signal together with switching means configured for directing the signal produced either over the Sum channel of the antenna, or over the Difference channel, or over both channels.

BRIEF DESCRIPTION OF THE DRAWINGS

The features and advantages of the invention will be better appreciated thanks to the description that follows, which description relies on the appended figures which show.

It should be noted that, in the various figures, the same functional element is identified by the same numerical identifiers.

DETAILED DESCRIPTION

Figure 1:
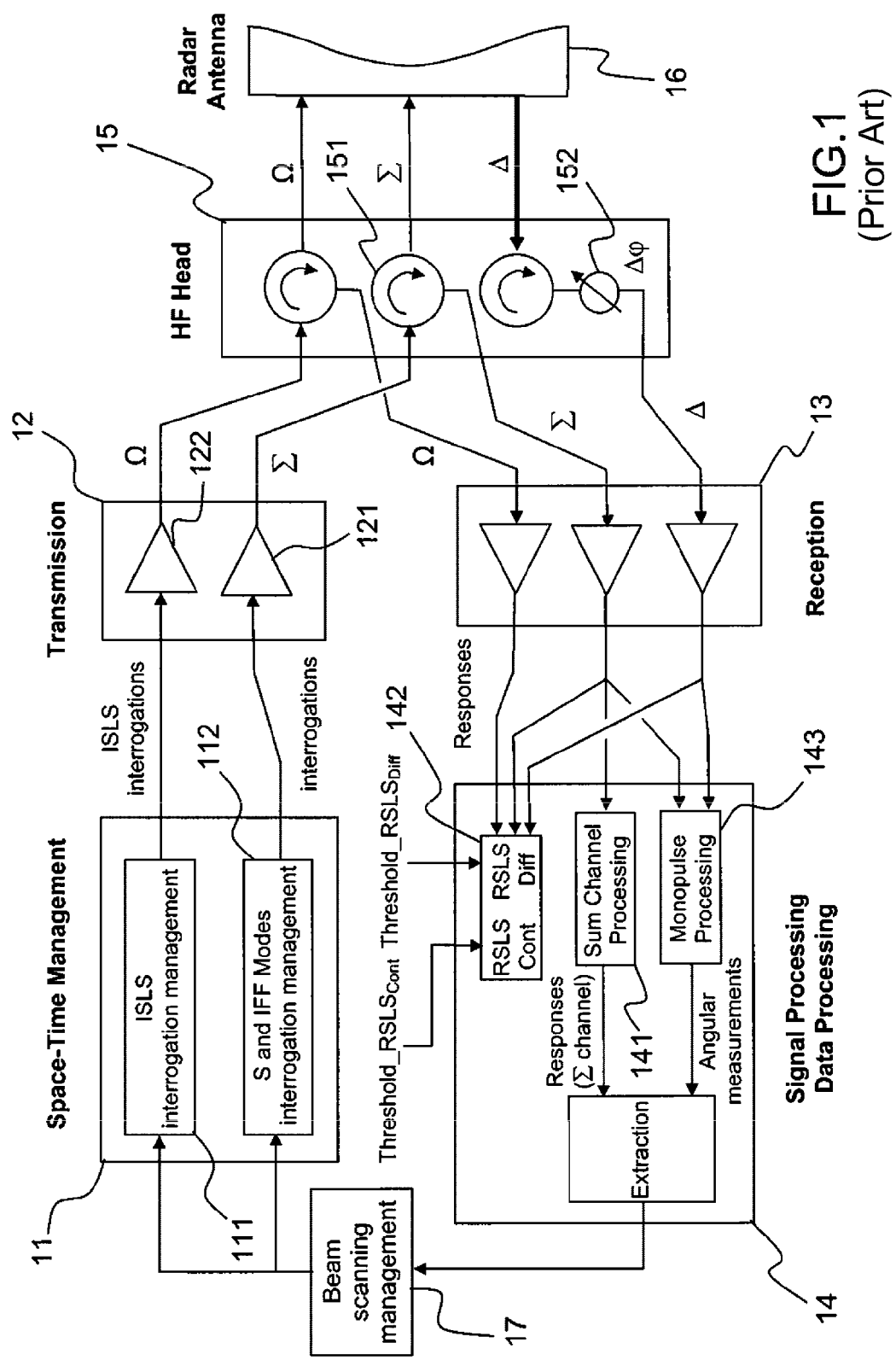
FIG. 1, a simplified layout of the structure of a current secondary surveillance radar.

As is shown by the diagram in FIG. 1, the architecture of a current secondary surveillance radar operating in S and/or IFF modes may be broken down into various functional blocks amongst which may be identified:

The Space-Time Management 11 (STM), which notably manages the transmission of the SSR interrogation messages in S Mode or in IFF mode by taking into account the radar tasks to be performed relating to the targets whose presence in the antenna beam (main lobe) is predicted by taking into account past events;

The Transmitter 12 (TX), which converts the interrogation messages into high-power RF signals at a frequency F1 (1030 MHz), and transmits these signals for their radiation by the antenna;

The Receiver 13 (RX), which demodulates the RF signals received by the antenna at a frequency F2 close to F1 (1090 MHz);

The processor for processing the signal 14 (SP) which processes the signals coming from the receiver and which detects and decodes the responses received in the main lobe of the antenna;

The HF head 15 (RF) which provides the routing of the signals between the transmitter, the receiver and the antenna, in other words which ensures the transfer of the interrogation signals produced by the transmitter to the antenna and ensures the transfer of the signals for the responses received by the antenna to the receiver, this routing being carried out for the 3 transmission and reception diagrams ($\Sigma$, $\Omega$, $\Delta$) or channels. For this purpose, the HF head 15 mainly comprises:

circulators 151 which allow the signals produced by the transmitter to be routed towards the antenna and those received by the antenna towards the receiver; according to the design principles adopted by the designers of the existing radar, the circulator on the Difference channel need not be present since separating transmission from reception is not necessary, the signals only being in reception. Nevertheless, a circulator is generally present on the Difference channel as it is on the Sum channel which allows a better symmetry to be obtained for the monopulse function.

a phase-shifter 152 which allows the signals received over the reception channels $\Sigma$ (Sum channel) and $\Delta$ (Difference channel) to be set in phase for the monopulse processing. The phase-shifter function is represented for this diagram in the HF head but it could just as easily be situated in the reception function.

The antenna 16 which provides the radiation by the $\Sigma$ and $\Omega$ channels of the signals produced by the transmitter, signals of frequency F1 (1030 MHz) that carry the interrogation messages generated by the radar (by the space-time management) and the pick-up, by the various channels ($\Sigma$, $\Omega$, $\Delta$), of the response signals of frequency F2 (1090 MHz) transmitted by the transponders located on board the aircraft.

The current secondary surveillance radar systems are very generally configured for utilizing the antenna diagrams in a conventional manner.

From the point of view of the transmission, only the channels Sum ($\Sigma$ channel) and Control ($\Omega$ channel) are used. For this purpose, the processor for Space-Time Management (STM) of the radar (11) comprises means 111, 112 for generating the interrogations over the two channels and thus for triggering the responses from the aircraft illuminated by the main lobe of the antenna.

From the point of view of the reception, the channels Sum (Σ channel) and Control (Ω channel) are used for the detection of the responses transmitted by the aircraft illuminated by the main lobe, of the Sum channel of the antenna, and the Difference channel (Δ channel) for the "monopulse" operation defining the localization of these targets in azimuth more precisely. For this purpose, the processor for processing the signal and processing data of the radar (14) comprises, in particular, suitable means (141, 142) for performing the detection of the responses carried by the signal received over the Sum channel (Σ channel), together with means (143) for carrying out the monopulse processing using signals received over the Σ and Δ channels (Difference channel).

It should be noted that, in a known manner, notably described in the French Patent 0311893 entitled "Method for pre-detection of responses in a secondary surveillance radar and application to the detection of S mode responses" and granted on Mar. 2, 2006, a secondary surveillance radar may be configured so as to also utilize the signals received by the Difference channel (Δ channel) in order to improve the detection, in particular in the case of garbling in the main lobe (entanglement of the responses in the main lobe), by carrying out the detection of the responses transmitted by the aircraft using these received signals. In such a configuration, not shown here, the processor for processing the signal 14, which processes the signals coming from the receiver, detects and decodes the responses received by the main lobe of the antenna via the Σ channel and also via the Δ channel.

Figure 2:
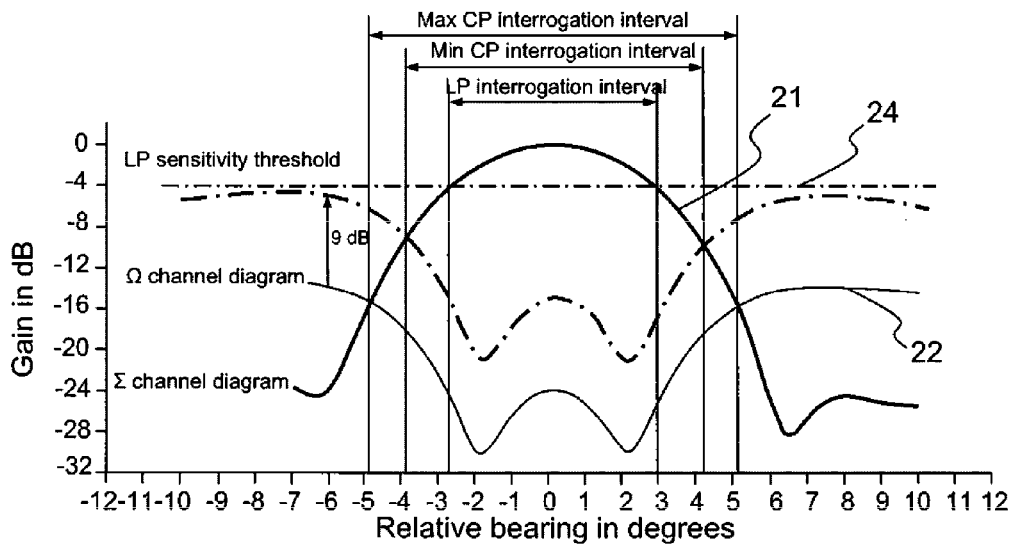
FIG. 2, graphical representations illustrating the limits of the current secondary surveillance radar systems in terms of illumination time of the targets.
Figure 2:
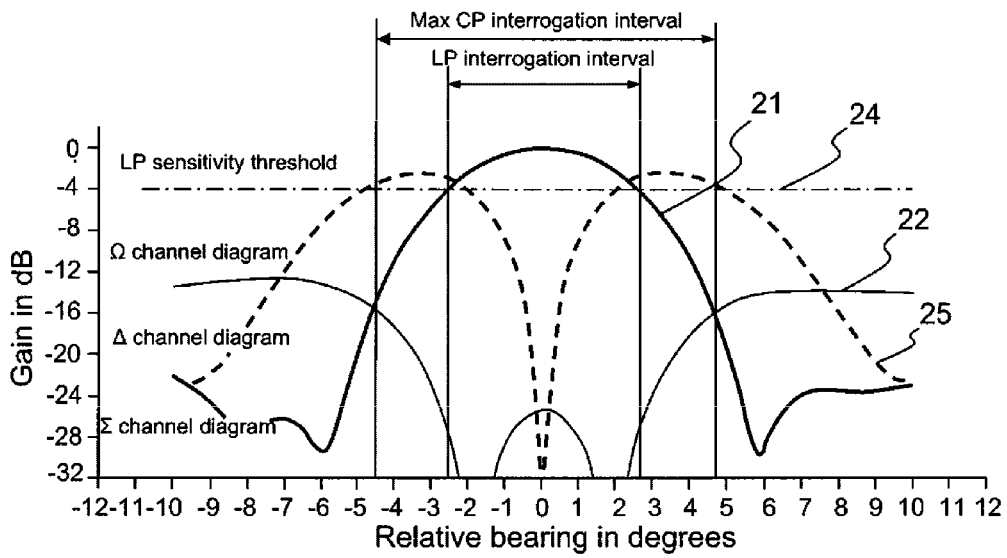

With such an architecture, the current secondary surveillance radar systems are constrained, as has been previously stated and, in view of the existence of side lobes on the main lobe of the antenna (Sum channel) and of the limited sensitivity of the transponders, to performing all of the interrogation operations requested in a given azimuth during the time window where the azimuth in question is scanned by the antenna beam main lobe Sum channel and only during that interval of time corresponding to the illumination of the target. The representations 2_A and 2_B in FIG. 2 illustrate this limitation at the transmission (2_A) and in reception (2_B) by way of the curves representative of the diagrams 21, 22 and 25 corresponding, respectively, to the Σ, Δ and Ω channels, and of the minimum sensitivity threshold 24 of the transponders in transmission and of the radar in reception.

As has been previously stated, the aim of the patent consists in protecting an architecture allowing the very substantial lengthening, or even practically doubling, of the illumination time of a target for a secondary surveillance radar with rotating antenna in a given azimuth, and to do this without modification of the antenna.

In order to achieve this performance, the operation and the conventional structure of a secondary surveillance radar are modified so as to:

also transmit interrogation messages by the Difference channel (conventionally only used in reception for the monopulse function in the main antenna lobe centre);

also perform the detection of the transmitted responses using the signals received by the Difference channel;

manage the transmission channels of the radar and, in particular, determine for each interrogation message over which transmission channel (Sum channel and/or Difference channel) depending on the nature of the interrogation and the predicted/detected position of the intended target at the moment in question, in other words the fact that it can be illuminated by the antenna lobe forming the Sum channel and/or by the antenna lobes forming the Difference channel.

According to the invention, the principles for measurements of the relative levels of the signals received over the Σ and Ω channels, which control the transmission of responses by the transponders (ISLS), which principles were previously described, are applicable in an identical manner for controlling the transmission of responses by the transponders (ISLS) using the signals transmitted over the Δ channel.

Figure 3:
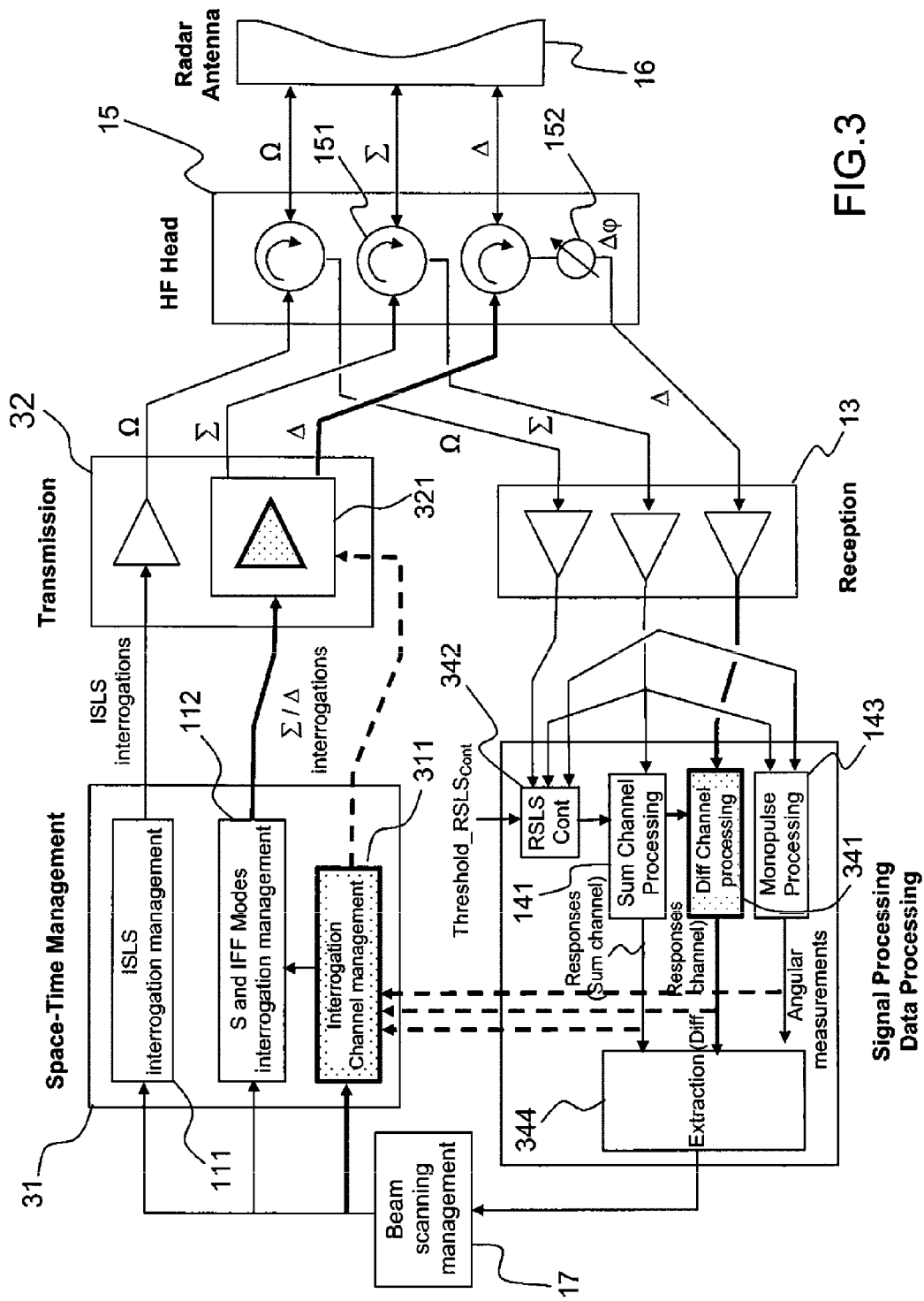
FIG. 3 a simplified layout of the structure of a secondary surveillance radar according to the invention.

FIG. 3 shows the schematic structural layout of the secondary surveillance radar architecture according to the invention. As can be observed, the architecture provided consists of a conventional architecture, such as that previously described, into which new elements have been incorporated.

Thus, according to the invention, the transmitter 32 comprises means 321 for allowing the transmission by the Sum channel (Σ channel) and/or by the Difference channel (Δ channel), at the frequency F1 (1030 MHz), of the RF signals carrying interrogation messages transmitted by the radar.

Similarly, the processor (SP) for processing the signal and for processing data comprises aside from, in a known manner, the means 141 for processing the signals received at the frequency F2 (1090 MHz) by the Σ channel, means 341 for processing the signals received at the frequency F2 (1090 MHz) by the Δ channel and detecting responses transmitted by transponders located on board aircraft.

Similarly again, the Space-Time Management 31 here comprises means 311 for managing the interrogations and the channels. These means allow it to be decided, for the next monitoring period, over which channel (Σ channel and/or Δ channel) a given interrogation in S mode or in IFF mode will need to be transmitted at the moment in question within this period. For this purpose, they take into account the detections carried out over the Σ channel, those carried out over the Δ channel, together with the angular measurement relating to each detection and to the information delivered by the means 17 for managing the scanning of the antenna beam. Accordingly, depending on the embodiment envisaged, the time management comprises means for generating and delivering to the transmission means either interrogation messages for transmission by the Sum channel of the antenna, or "Sum channel" message, or interrogation messages for transmission by the Difference channel of the antenna, or "Difference channel" message, or else by both antenna channels simultaneously.

According to the invention, the responses detected on the Difference channel (Δ channel) by the processor SP are taken into account by the extraction means 344 as a complement for those detected on the Sum channel (Σ channel), this information being rendered coherent with the information produced by the monopulse processing. In this way, a radar blip, corresponding to the response transmitted by an aircraft, can be detected on the signal coming from the Σ channel or on the signal coming from the Δ channel or simultaneously on these two signals. For this purpose, the conventional extractor is subjected to a slight upgrade which consists in extending the size of a blip in azimuth, in taking into account the responses coming from the signal received by the Difference channel and in combining the double responses coming simultaneously from the signals of the Sum and Difference channels (for the same period of illumination within the same antenna rotation).

It should be noted that, in the new architecture according to the invention, as illustrated in FIG. 3, the RSLS-DIFF function is naturally suppressed. On the other hand, the RSLS-CONT function is also applied to the responses detected on the Difference channel. In this manner, the transponder responses received by the reception Δ channel are not suppressed given that they have a level higher than the level of the corresponding signal measured on the reception Cont channel. Subsequently, the means for detecting differentiated thresholds 142 applied to the only detection Σ channel implemented in the known structure illustrated in FIG. 1 (RSLS-Diff and RSLS-Cont) are replaced by threshold detection means 342 whose action is applicable over the two reception Σ and Δ channels implemented in the structure according to the invention, as is illustrated in FIG. 3.

Figure 4:
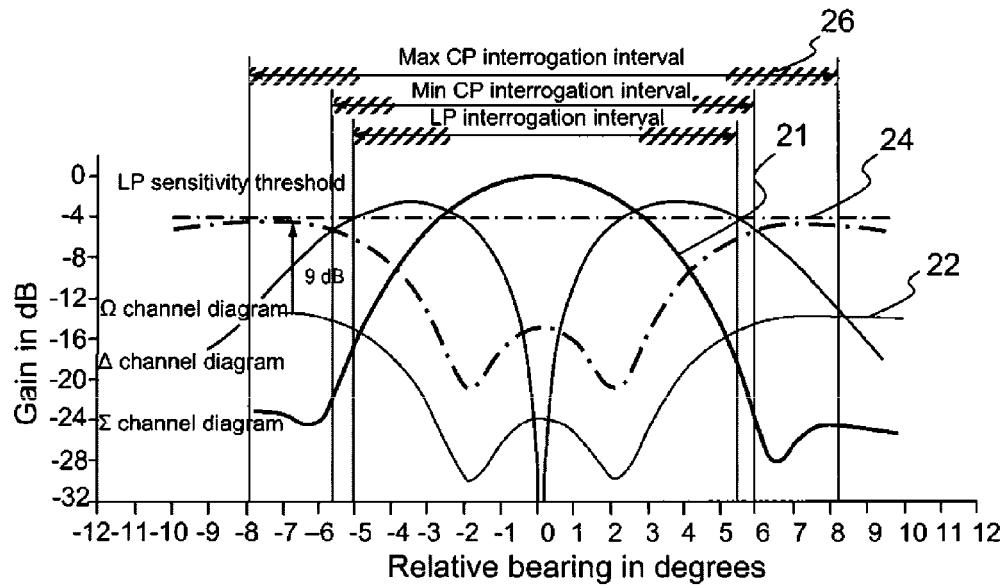
FIG. 4, graphical representations illustrating the increase in the illumination time of the targets obtained by implementing a secondary surveillance radar according to the invention.
Figure 4:
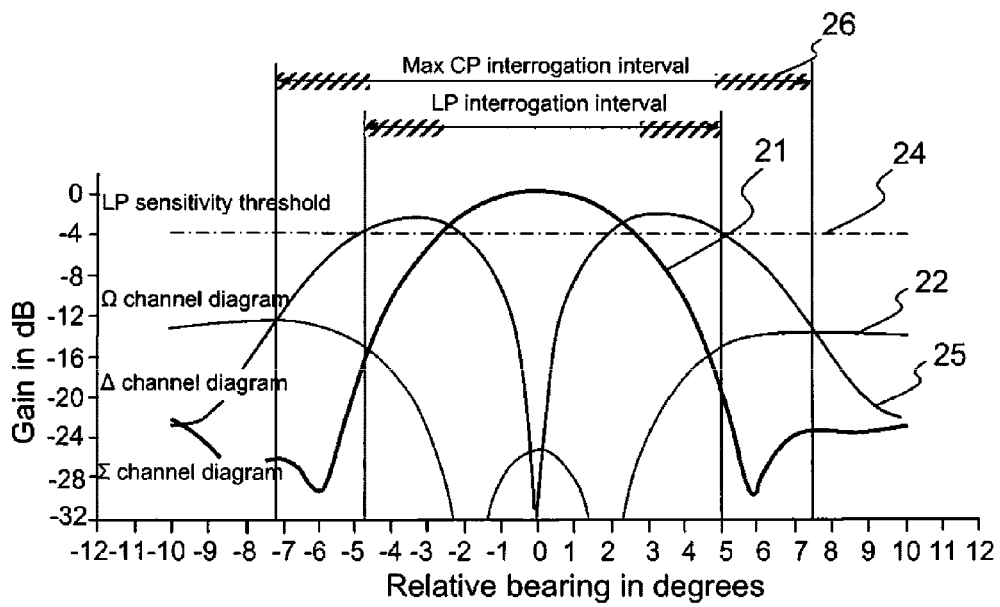

Thus, by making possible the use of the Difference channel for transmitting interrogation messages and for detecting the responses transmitted by transponders, the architecture according to the invention advantageously allows a very substantial increase, or even a doubling in certain cases, of the time during which a secondary surveillance radar with rotating antenna illuminates a given azimuth at each antenna rotation, and it does this without modification of the antenna. The available illumination time being thus increased, it is possible for the secondary surveillance radar for a given direction (i.e. for a given azimuth) either to interrogate a greater number of aircraft at each antenna rotation (S mode), or to carry out a greater number of data transactions of the EHS (BDS) type with the aircraft at each antenna rotation (S mode), or else to dispose of more time for interrogating the same aircraft (IFF mode). The shaded areas 26 of the representations 4_A and 4_B in FIG. 4 illustrate this possible increase in the illumination time by relaxing the constraints at the transmission (4_A) and in reception (4_B). The representations 4_A and 4_B in FIG. 4 respectively correspond to the representations 2_A and 2_B in FIG. 2.

From a hardware point of view, the modifications applied to the various elements of a secondary surveillance radar concerned by the provision of a longer illumination time, and also by the utilization of this lengthening of the illumination time, are described in the following part of the text. They relate mainly to modifications of the structure of the transmission means 12, space-time management means 11 and means for processing the signal and for processing data 14.

Figure 5:
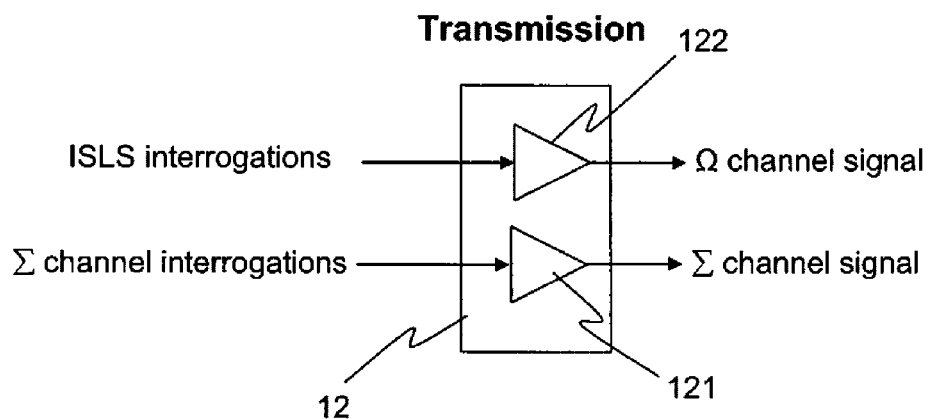
FIG. 5, a simplified layout showing the structure of the transmission means of a secondary surveillance radar according to the prior art.

From the point of view of the transmission function, the provision of means allowing the radar to transmit interrogation messages can take the form of various alternative embodiments which may be implemented on the transmission means 12 such as they generally exist in a secondary surveillance radar, illustrated schematically in FIG. 5.

In a conventional configuration, the transmitter 12 notably comprises two separate power amplification channels 121, 122 allowing the simultaneous supply of the channels Sum (Σ channel) and Control (Ω channel) of the antenna 16 necessary for the transmission of the actual interrogation messages together with the transmission of the interrogation signal (ISLS), allowing the implementation of the ISLS function of the Sum channel (Σ channel). As a result, based on the existing structure, various more or less sophisticated modifications in architecture may be implemented in order to carry out the transmission of the interrogation messages over the Difference channel (Δ channel) of the antenna 16. These modifications in architectures correspond to variant embodiments of the invention, three examples of which are presented in the following part of the text. These three non-limiting examples of the invention correspond to possible competing variant embodiments.

Figure 6:
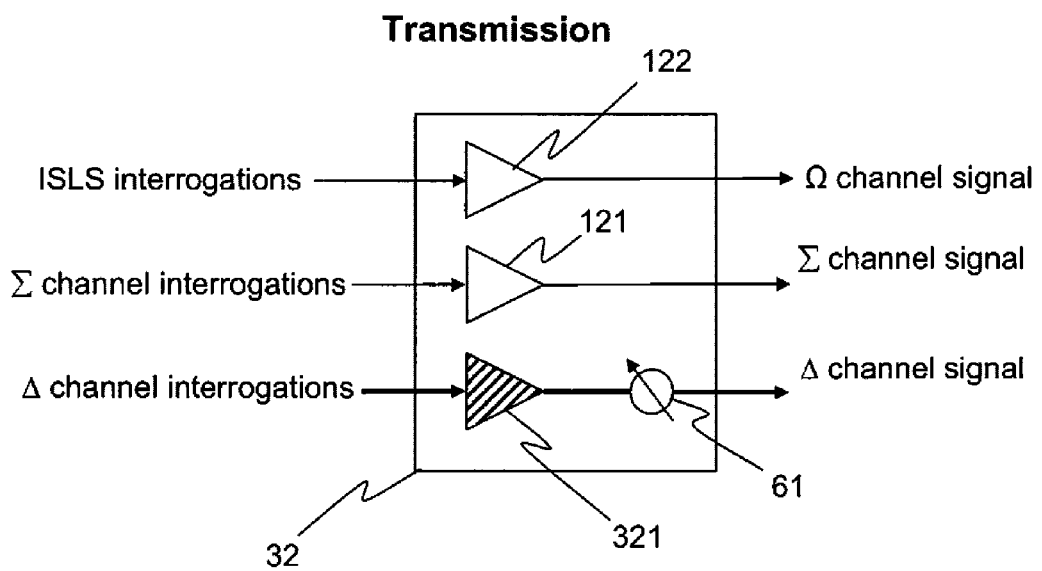
FIGS. 6 to 8, simplified layouts showing the structure of the transmission means of a secondary surveillance radar according to the invention according to three variant embodiments.

Thus, in a first variant embodiment, illustrated in FIG. 6, the existing structure can be modified by simply adding an independent transmission channel 321, dedicated to the interrogation messages to be transmitted by the Difference channel, to the two existing transmission channels 121 and 122.

This solution, shown in FIG. 3, is simple to implement given that it does not affect the existing structure, the additional channel 321 being implemented independently of the two conventional channels 121 and 122. Furthermore, given that the means 31 for generating the interrogation message are configured so as to be able to simultaneously deliver two separate or identical interrogation messages over two different channels to the transmission means, this solution allows the simultaneous transmission of identical or different interrogation messages over the channels Sum (Σ channel) and Difference (channel Δ), and at full power on each channel. However, it proves to be costly to implement, given that, since none of the elements forming the added amplification channel are in common with the existing channels, it requires a significant hardware upgrade. Furthermore, in such an implementation, as illustrated in FIG. 3, the means carrying out the Space-Time Management 31 of the radar comprises means 311 for allowing the transfer to the transmission means 32, via two different channels, of the interrogation messages intended for the Sum channel ("Sum channel" messages), on the one hand, and for the Difference channel ("Difference channel" messages) on the other. According to the invention, these messages may be identical or different.

Figure 7:
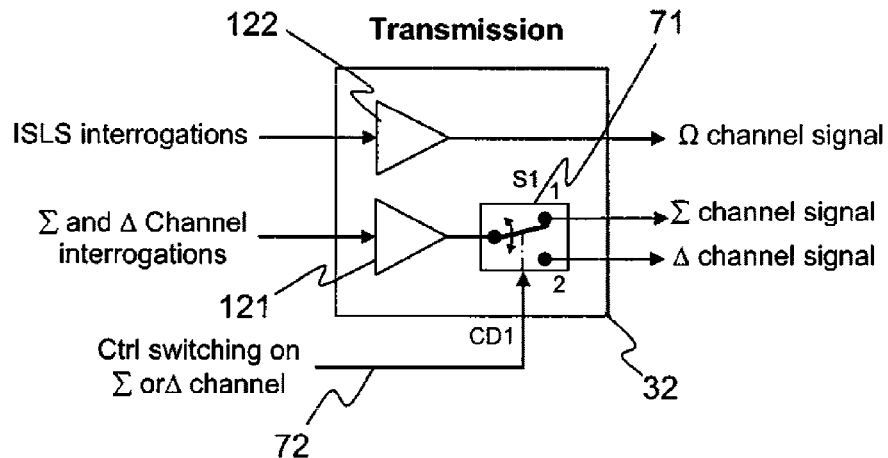

A second variant embodiment, illustrated in FIG. 7, turns out to be less costly in hardware to implement. In this case, the interrogation messages are to be alternately transmitted over the Sum channel (Σ channel) or over the Difference channel (Δ channel). For this purpose, a power microwave switch 71 is inserted at the output of the amplification chain 121 initially dedicated, in the known architecture, to the single Sum channel (Σ channel), the switch 71 being itself controlled by a control signal 72 delivered by the means carrying out the Space-Time Management 31 of the radar.

This second variant has the advantage of being implemented with inexpensive hardware since it makes maximum use of the existing transmission functions. Indeed, it only requires the addition of a microwave switch 71 to the transmission means 12 of the radar, and the production of a control signal 72 within the means 311 of the sub-assembly carrying out the Space-Time Management 31 of the radar. The control signal is here determined according to the channel over which the interrogation message in question must be transmitted.

On the other hand, with respect to the first variant, it proves to be limiting in terms of operation. Indeed, such a variant does not allow identical or separate interrogation messages, or else other signals, to be transmitted simultaneously over the channels Sum (Σ channel) and Difference (Δ channel), such that, at a given moment, transmission is only possible over one of the antenna channels. Furthermore, the insertion of a switch is accompanied by a certain loss of power at the transmission and a reduction in performance in terms of range of the radar after implementation of the invention. However, since this lowering of power is relatively modest, this economical variant embodiment can be advantageously envisaged, notably when the maximum reduction in range of the radar remains limited.

Figure 8:
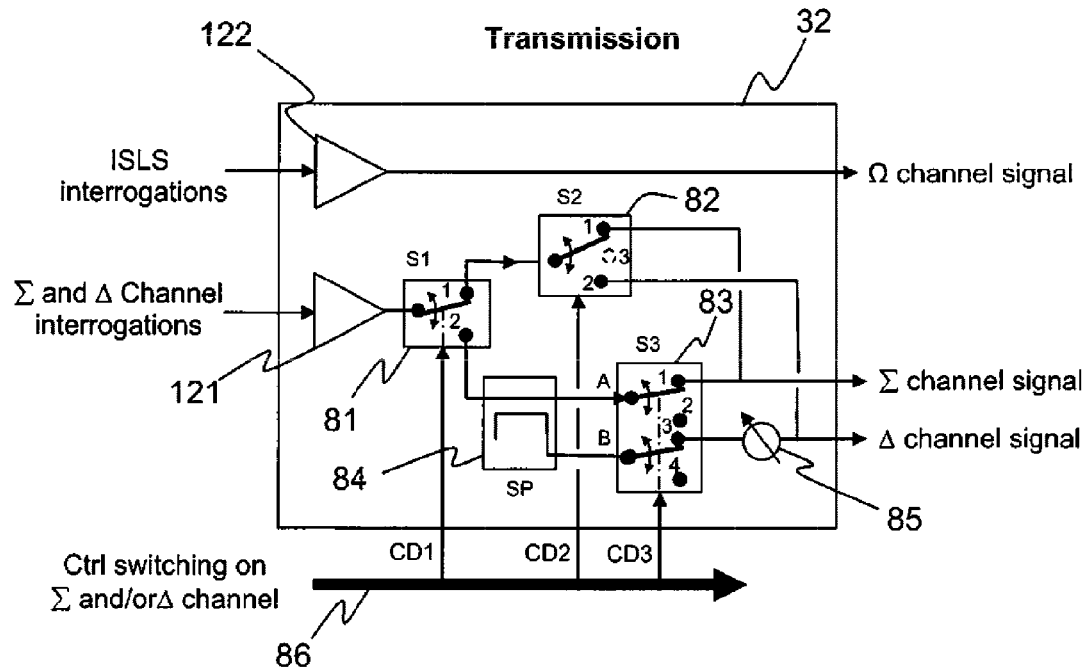

A third variant embodiment consists in adopting the intermediate scenario illustrated in FIG. 8. According to this variant embodiment, the modification to be applied to the known structure of the transmission means 12 is a switching device such as that illustrated in FIG. 8. This device comprises three switches S1, S2 and S3, together with a power divider element SP, for example a microwave coupler.

The switch S1, 81, is a power microwave switch with one input channel and with two exclusive positions giving access to two output channels each of which is connected to the input of one of the two other power microwave switches S2 and S3.

S1 is controlled by a control signal CD1 delivered by the sub-assembly carrying out the Space-Time Management 31 of the radar.

The switch S2, 82, is a power microwave switch with one input channel and with three exclusive positions giving access to two output channels, one position corresponding to the electrical isolation of the input, a position for which the signal present at the input is not connected to any of the output channels. S2 is controlled by a set of control signals CD2 delivered by the sub-assembly carrying out the Space-Time Management 31 of the radar.

On the other hand, the switch S3, 83 is a double power microwave switch, comprising two separate inter-locked switches. Each switch is a switch with one input channel and with t exclusive positions giving access to one output channel, one position corresponding to the electrical isolation of the input, a position for which the signal present at the input is not connected to the output channel.

The switch S3 is controlled by a control signal CD3 delivered by the sub-assembly carrying out the Space-Time Management 31 of the radar.

According to the invention, as illustrated in FIG. 8, the input of the switch S1 is connected to the output of the amplification chain 121 initially dedicated, in the known architecture, to the single Sum channel. One of the outputs of the switch S1 is connected to the input of the switch S2, whereas the other output is connected to the input of an SP microwave divider, 84, each of whose two outputs is connected to one of the inputs of the switch S3. In addition, each of the output channels of the switch S2 is connected to one of the output channels of the switch S3, so as to form the outputs "Sum channel (Σ channel)" and "Difference channel (Δ channel)" from the amplification means 32.

Like the second variant described previously, this third variant embodiment has the advantage of being implemented with relatively inexpensive hardware. Indeed, it only requires the addition of the microwave switches 81, 82, 83 to the transmission means 12 of the radar, and the production of control signals CD1, CD2 and CD3 within the means 311 of the sub-assembly carrying out the Space-Time Management 31 of the radar, these signals being delivered in the form of a control bus 86, for example.

This third variant embodiment is furthermore less limiting than the second variant since, as illustrated in FIG. 8, it allows various configurations to be adopted for the various switches which allows interrogation messages to be transmitted over the channels Sum (Σ channel) and Difference (Δ channel), either alternately or simultaneously. From a functional point of view, it thus comes close to the first variant embodiment, while at the same time having the advantage of a lower cost of production. However, in the case of a simultaneous transmission of interrogation messages over the two channels, it should be noted that, in contrast to what happens for the first variant embodiment, the interrogation messages simultaneously transmitted are identical on the two channels. Furthermore, in the case of simultaneous transmission, it should also be noted that, in contrast to what happens for the first variant embodiment, the power of the signals carrying the information messages over each of the channels sees its power limited to half of the power delivered by the amplification element 121 in its initial configuration.

It should be noted that, for the first and the third variant embodiments, one particular embodiment incorporates into the Difference channel a phase-shifter element 61 or 85, a controllable phase-shifter for example, whose function is to allow, in the case of simultaneous transmission of signals over the channels Sum (Σ channel) and Difference (Δ channel), the radiated signals to be set in phase in order to ensure their optimum recombination in space.

From the point of view of the means for processing the signal and for processing data (extraction—tracking), the modifications applied to the known equipment consist in the installation of a chain 341 for processing the signals transmitted by transponders and received by the Difference channel (Δ channel).

According to the invention, the chain 341 for processing signals received by the Difference channel (channel Δ) implements functions similar to those implemented by the chain 141 for processing the signals received by the Sum channel. These processing functions, known from elsewhere, are not detailed here. Accordingly, in reception, the Difference channel (Δ channel) is used both for the conventional implementation of the monopulse processing 143 and for implementing the detection processing for responses coming from aircraft interrogated by the radar, this processing being carried out in parallel with the existing processing 141 carried out on the signal received by the Sum channel (Σ channel).

As has been previously stated, since the reception Difference channel (Δ channel) is used for the detection of the responses transmitted by transponders, the RSLS-DIFF function, which operates by comparison of the signal level received by the Difference channel (channel Δ) and of the signal received by the Sum channel (Σ channel), is suppressed. The responses coming from the transponder of the aircraft via the Difference channel (Δ channel) are detected like those received via the Sum channel (Σ channel). Accordingly, a complementary signal: RSLS-CONT is obtained by the comparison of the channels Difference (Δ channel) and Control (Ω channel) for inhibiting the responses received on side lobes of the Difference channel (Δ channel).

From the point of view of the modifications applied to the sub-assembly carrying out the Space-Time Management of the radar, it should be noted that, conventionally, the Space-Time Management function 11 is, in practice, broken down into two parts.

Firstly, the means 17 responsible for the management of the antenna scanning, or "Scan Processing" according to the terminology in current usage, are separated out. In a known manner, the function of these means is to predict, for the coming antenna rotation, characteristics of the targets, of the transponders, to be interrogated when the antenna beam scans the direction in question. These predictions are generated based on information acquired during the preceding rotations. These predictions encompass, for each transponder identified, the predicted information for position and the tasks to be accomplished by the radar (ELS, EHS, IFF, etc.) relating to the transponder in question.

Subsequently, the means providing the Space-Time Management function 11 (STM) are separated out. These means provide the management, the sequencing, in the antenna lobe of the interrogation operations to be carried out and of the monitoring operations associated with each interrogation. These operations are predicted by the management means 17 for the antenna scanning (Scan Processing) and are honed in real time (during the passage of the antenna lobe in the azimuthal direction for each target) by the Space-Time Management 11 (STM) as a function of the results obtained (i.e. of the detections made) during the preceding monitoring period carried out in the same antenna lobe (re-interrogation of the same transponder if the first interrogation fails, for example).

According to the invention, the Space-Time Management (STM) function 31 comprises, aside from the means 111 and 112 for generating the information messages to be transmitted, means 311 for carrying out the management of the transmission channels to be used and, in particular, for determining, for each target, whether transactions over the Difference channel (Δ channel) are to be carried out.

For this purpose, these means 311 determine in particular whether, for each expected aircraft, transactions (transmissions of interrogations and reception of responses) over the Difference channel (Δ channel) are needed.

This is notably the case in IFF operation for which the transactions (transmissions of interrogations and reception of responses) over the Difference channel (Δ channel) are systematically undertaken so as to increase the duration of illumination of each transponder and, as a result, to improve the performance of the radar identification in the presence of jammers.

This is also the case in S mode, for which transactions are carried out over the Difference channel (Δ channel) depending on the maximum percentage of the illumination time by the antenna lobe corresponding to the Sum channel (Σ channel) allocated to S mode and on the number of selective transactions to be carried out, both the transactions relating to elementary selective interrogations or ELS (ELementary Surveillance) selective interrogations and the transactions relating to enhanced selective interrogations or EHS (EnHanced Surveillance) selective interrogations. Thus, if all the transactions cannot be carried out within the illumination time by the antenna lobe corresponding to the Sum channel (Σ channel), taking into account uncertainty margins, the EHS transactions relating to the aircraft situated in the nearby region are carried out over the Difference channel (Δ channel) as long as the aircraft candidates for the remaining transactions in ELS mode are not illuminated by the antenna lobe corresponding to the Sum channel (Σ channel).

Also for this purpose, these means 311 notably determine whether, for each S Mode selective interrogation, transactions over the Difference channel are to be carried or not.

This is notably the case in the case of EHS interrogation of an aircraft carried out successfully while the aircraft is illuminated by the leading edge (right-side) of the lobe corresponding to the right-hand Difference channel (Δ channel): the EHS interrogations then cease for this aircraft and only the ELS transactions go ahead and only over the Sum channel (Σ channel).

This is also the case in the case of failure of ELS transactions by the Sum channel (Σ channel): the ELS transactions are then carried out by the left-hand Difference channel (Δ channel) in order to avoid missing a detection (a less precise blip is always preferable to the absence of a blip).

In order to fulfill their function, the means 311 associate the information supplied by the means 17 for management of the antenna scanning (Scan Processing) with the information on detections generated by the processing of the Sum channel 141 and the processing of the Difference channel 341. They furthermore utilize the information supplied by the monopulse processing 143 in order to determine, for each detection made in reception on the Difference channel, whether the latter corresponds to an aircraft illuminated by the right lobe (lobe in advance of the lobe of the Sum channel corresponding to the entry of an aircraft into the illumination of the radar) or by the left lobe of the Difference transmission channel (retarded lobe with respect to the lobe of the Sum channel corresponding to the exit of an aircraft from the illumination of the radar).

From a functional point of view, the means 311 request the Management means 112 to generate the interrogation messages from the information relating to the transmission channel via which the message in question is assumed to be transmitted by the radar.

As far as the first variant embodiment of the transmission means 32 according to the invention is concerned, which variant has been previously described, the means 311 supply directly to the transmission means associated with each diagram (Sum channel transmitter and Difference channel transmitter) the messages to be transmitted to the desired channel or simultaneously to the desired channels of the antenna.

Furthermore, as far as the second and the third variant embodiment of the transmission means 32 according to the invention are concerned, which variants have been previously described, the means 311 supply to the transmission means the various control signals needed for routing the transmission signals towards the desired channel or channels. These control signals thus allow the power signal to be alternately routed onto one or the other of the transmission channels or else onto both channels simultaneously.

The table hereinbelow gives examples of control logic for the routing of the power signal in the case of the second variant embodiment (Table 1) and in the case of the third variant embodiment (Table 2).

TABLE 1

Second variant embodiment of the transmission means

| Ctrl Position S1 | Transmission channel |
|---|---|
| 1 | Sum channel (Σ channel) |
| 2 | Difference channel (Δ channel) |

TABLE 2

Third variant embodiment of the transmission means

| Ctrl Position S1 | Ctrl Position S2 | Ctrl Position S3 | Transmission channel |
|---|---|---|---|
| 1 | 1 | X | Sum channel (Σ channel) |
| 1 | 2 | X | Difference channel (Δ channel) |
| 2 | X | 1-3 | Channels Σ and Δ (mid-power) |

In the case of the first variant embodiment of the transmission means 32 according to the invention, via a simple decision to use one, the other or both transmitters this enables the 3 possible configurations described in Table 2 with additionally the advantage that the third configuration, for transmission over both channels simultaneously, is made with no loss of power.

The architecture according to the invention such as previously described thus advantageously allows advantage to be taken of the existence of a Difference channel (Δ channel) of the Antenna 16, normally used only in reception in order to implement the monopulse processing, in such a manner as to utilize the part of the antenna lobe corresponding to the diagram of the Difference channel in order to carry out transactions with aircraft while the latter are still not or are already no longer illuminated by the part of the antenna lobe corresponding to the diagram of the Sum channel (Σ channel). The period of time over which the same aircraft is illuminated by the antenna lobe, and consequently the number of transactions that may be carried out at each passage of the antenna lobe in the direction (bearing) in question, is thus substantially increased. According to the invention, this result is advantageously obtained, without it being necessary to modify the antenna itself and hence the means generating the formation of the microwave Sum and Difference diagrams. The invention therefore advantageously does not involve any alteration of the radar performance mainly associated with the antenna, such as the precision for example.

The following part of the document presents two practical illustrations which highlight, for an operation in S mode and for an operation in IFF mode, the advantageous manner in which the invention improves the operation of a secondary surveillance radar.

The first illustrative example relates to the transactions in S mode. In this mode of operation, in view of the imposed increase in the speeds of rotation of the antennas, the operational need of secondary surveillance radar systems mainly consists in increasing the illumination time in order to allow an increase in the local density of aircraft along a azimuth to be addressed. In other words, in the sequencing mode according to the invention, the number of aircraft to be processed in a given time has been substantially increased.

Figure 9:
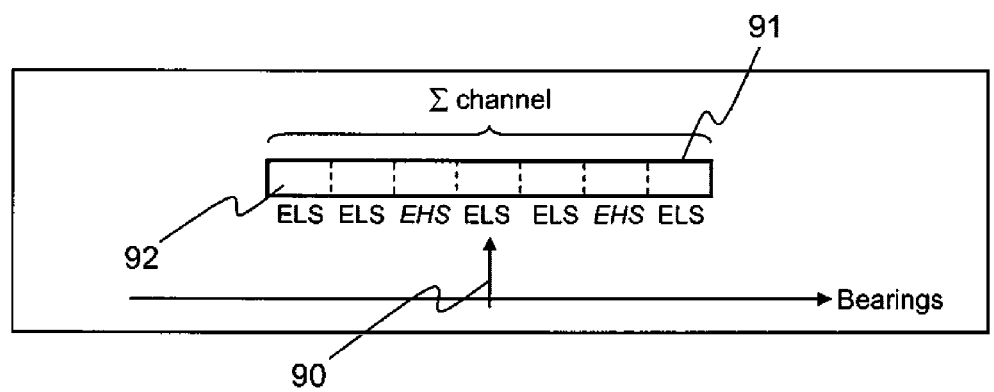
FIG. 9, a schematic layout illustrating the manner in which the sequencing of the interrogations in S mode is carried out in a secondary surveillance radar functioning according to the prior art.

The schematic layout in FIG. 9 illustrates the manner in which the sequencing of the interrogations in S mode is carried out for a secondary surveillance radar operating in a current, known, configuration.

In such a configuration, the ELS surveillance transactions carried out with the aircraft are in principle carried out for each azimuth 90 in question, in other words for each azimuth in which the presence of an aircraft is expected, while this azimuth is situated inside of the region illuminated by the antenna lobe 91 corresponding to the Sum channel, this antenna lobe scanning the azimuths at the rhythm of the rotation of the antenna. This mode of operation is imposed in principle, given that it is desired to achieve a precise localization of this aircraft by means of the error function of the radar (monopulse processing in reception on the channels Sum ($\Sigma$ channel) and Difference ($\Delta$ channel)).

Furthermore, the EHS transactions for exchanges of data in S mode are also carried out for each azimuth 90 in question, while this azimuth is situated inside of the region illuminated by the antenna lobe 91. Now, with regard to exchanges of data, taking into account a single window of illumination formed by the antenna lobe 91, only corresponding to the Sum channel, is not justified by the necessity to carry out the localization of the aircraft, this being carried out elsewhere. However, the hardware configuration of the current radar systems does not allow them to operate differently, the ELS and EHS transactions being necessarily made over the Sum channel (channel $\Sigma$).

As a result, since each interval of time employed for carrying out the transactions has a given duration which corresponds to a azimuth range 92, the number of possible ELS or EHS transactions in the given direction 90 of a given aircraft, seven transactions in the illustration in FIG. 9 for example, is limited by the azimuth coverage of the single lobe 91. Consequently, as illustrated in the figure, this mode of operation may lead to the occurrence, for a given azimuth, of conflicts between tasks to be executed, several transactions needing to be carried out in an illumination time 91 that is insufficient for placing all the transactions to be carried out, numerous aircraft being present simultaneously in the same azimuthal sector. As a result, since the priority is given to the Surveillance (ELS transactions), the execution of EHS transactions can then hardly be envisaged at a long distance away for a long-range radar rotating at high speed.

Figure 10:
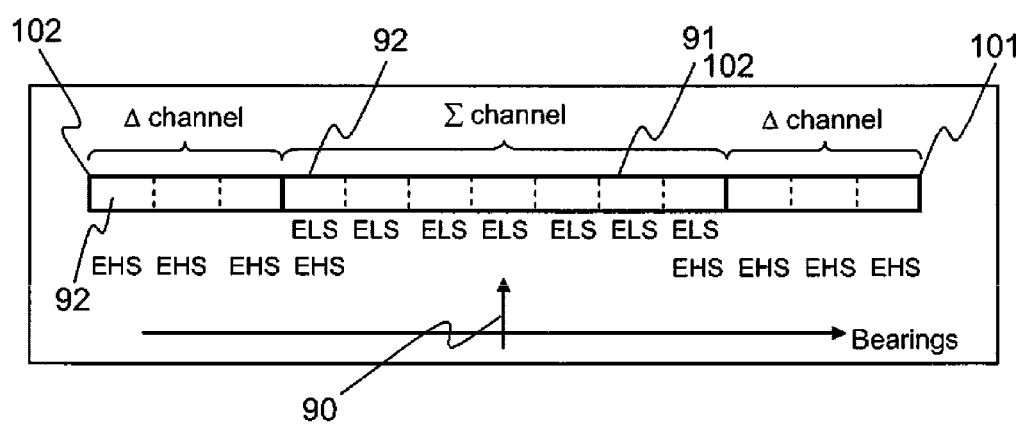
FIG. 10, a schematic layout illustrating the manner in which the sequencing of the interrogations in S mode is carried out in a secondary surveillance radar functioning according to the invention.

The schematic layout in FIG. 10 illustrates, on the same example, the manner in which the sequencing of the interrogations in S mode is carried out for a secondary surveillance radar operating in a configuration corresponding to the architecture according to the invention.

In this new configuration, the ELS surveillance transactions are still carried out for each azimuth 90 in which an aircraft is localized, while this azimuth is situated inside of the region illuminated by the antenna lobe 91 corresponding to the Sum channel ($\Sigma$ channel), this configuration being necessary for applying the error function (monopulse processing) that allows the aircraft to be precisely localized in azimuth.

On the other hand, given that the secondary surveillance radar disposes of the possibility for additionally transmitting interrogations via the Difference channel ($\Delta$ channel) and for processing the responses received by this same Difference channel, EHS data exchange transactions in S mode can then be carried out by means of the Difference channel, in other words when the azimuth in question is illuminated by the antenna lobes 101 or 102 corresponding to the Difference channel. As a result, for a given azimuth, the ELS and EHS transactions are able to be carried out, for a given aircraft, at different times during the antenna scanning. Consequently, even in the case of a long-range surveillance executed by a radar that comprises an antenna rotating at high speed, it is possible to execute, for the same azimuth of the axis of the antenna, a greater number of ELS and EHS transactions, where these transactions can be carried out at different moments in the interval of time during which the aircraft in question remains illuminated by the radar beam.

This advantageous extension of the time period during which a given bearing is illuminated by the radar thus advantageously allows the number of transactions that it is possible to execute for a given azimuth of the axis of the antenna to be substantially increased. The invention thus allows a radar system to be upgraded, without modifying the radiation diagram of the antenna, in such manner as to render it capable of satisfying the constraints caused by the growth in the number of aircraft together with the number of tasks to be executed and by the increase in the rotation speed of the antenna.

Figure 11:
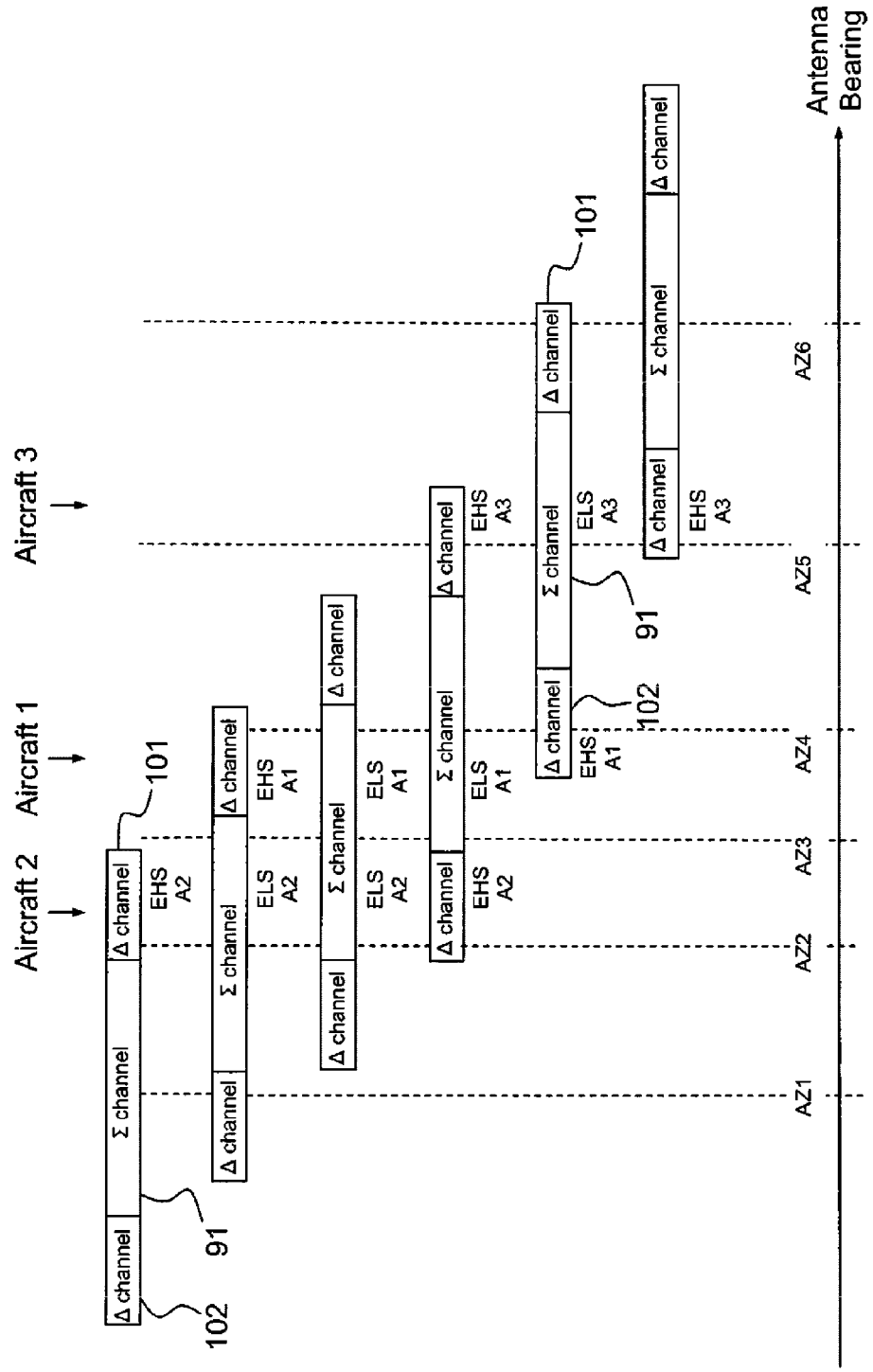
FIGS. 11 and 12, illustrations showing one example of simple application highlighting the advantageous nature of the invention in terms of increase in the number of transactions that can be carried out by a secondary surveillance radar.
Figure 12:
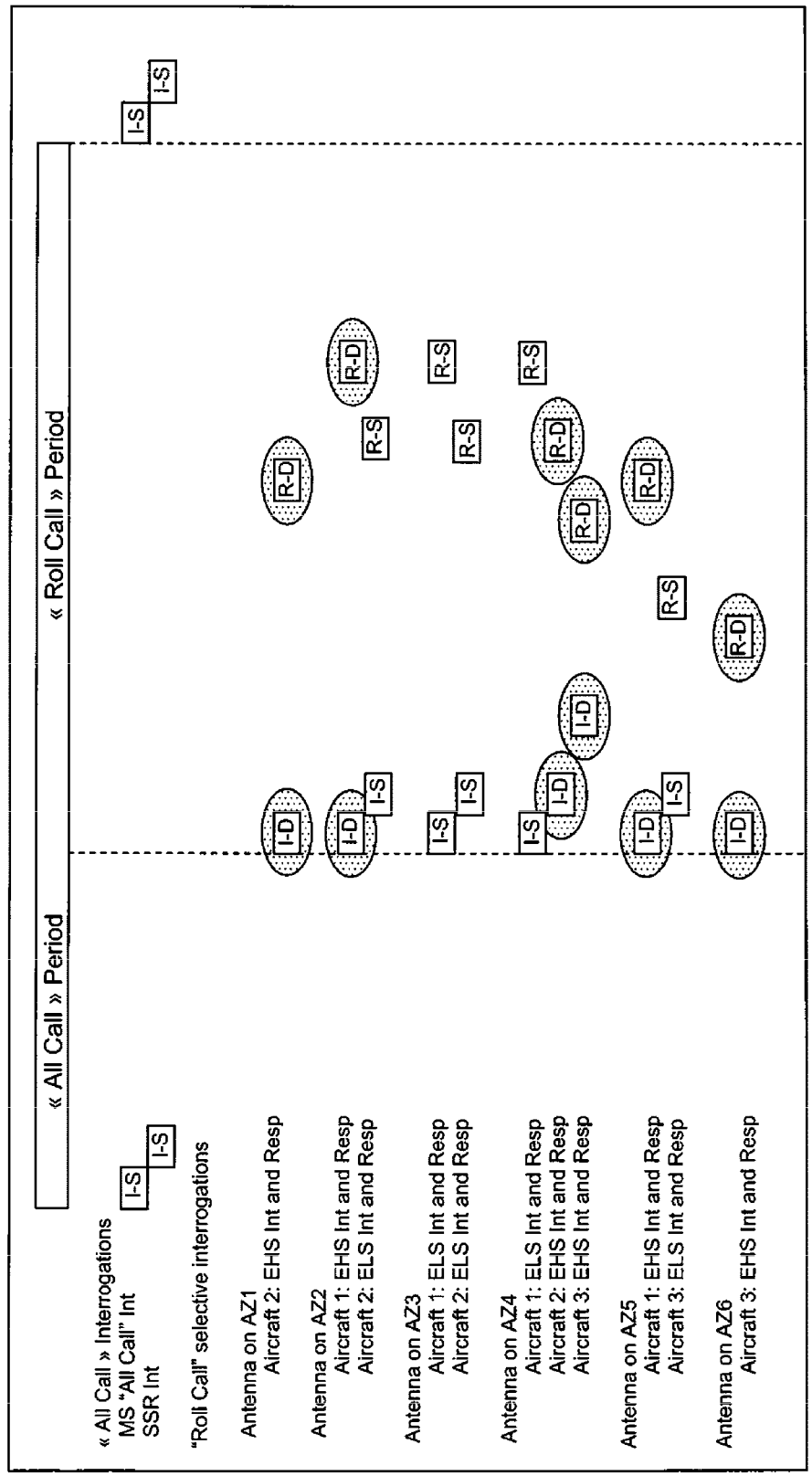

The schematic layouts in FIGS. 11 and 12 illustrate this advantageous property by way of a simple example of operational situation in which three aircraft are localized along azimuths A1, A2 and A3 in a region of space comprised between a azimuth AZ1 and a azimuth AZ6 successively illuminated by the antenna radiation diagram.

FIG. 11 shows, in an illustrative manner, the sequencing of the various transactions that can be effected by the radar with the three aircraft, during the scanning. The antenna beam is represented here while it successively illuminates over the aircraft 2, over the aircraft 1 then over the aircraft 3.

FIG. 12, on the other hand, highlights all of the transactions that can be carried out with one or more of these aircraft, located at different distances, depending on the azimuth on which the radiation diagram of antenna is centred.

FIG. 11 shows, for a few different successive positions of the central axis of the radar antenna (AZ1, AZ2, . . . , AZ6), during transaction periods (denoted "Roll Call periods" according to the terminology in current usage), the ELS and EHS interrogations that are then executed with the 3 aircraft.

In the context of FIGS. 11 and 12, it is assumed that the azimuthal sector including the azimuths AZ1 to AZ6 is very dense in aircraft to be interrogated with, for each aircraft, a significant number of BDS to be extracted. It is furthermore considered to be necessary to carry out several ELS interrogations for each aircraft (for raisons associated with the S Mode protocol or owing to simple difficulties in propagation or of electromagnetic pollution). As a result, the context is such that the Sum channel ($\Sigma$ channel) is totally used to carry out the ELS transactions and such that the EHS transactions are therefore systematically transferred onto the Difference channel (Δ channel). Thus, for a given transaction period 92, such as that carried out when the antenna illuminates the azimuth Z4, the radar will sequence:

an EHS interrogation by the right-hand Difference channel 101 (Δ channel) with the aircraft 3 localized along the azimuth A3 which is entering into the illumination of the radar, an ELS interrogation by the Sum channel 91 (Σ channel) with the aircraft 1 localized along the azimuth A1 placed in the centre of the illumination of the radar, an EHS interrogation by the left-hand Difference channel 102 (Δ channel) with the aircraft 2 localized in the azimuth A2 which is exiting from the illumination of the radar, This configuration taken as an example allows the advantageous nature of the invention to be clearly highlighted which makes possible the execution of certain tasks by the Difference channel.

The schematic layout in FIG. 12 details, for the same example, the sequencing of these interrogations during the transaction periods 92 corresponding to the various positions AZ1 to AZ6 of the central axis of the radar antenna, taking as the scenario targets A1, A2 and A3 whose respective distances D1, D2 and D3 to the radar are such that D1>D2>D3.

It should be noted that the optimization of the placement of the function for placing the various interrogations to be carried out in the selective transaction periods, referred to as "Roll Call periods", addresses a known problem which can be solved by any known method. It is not therefore detailed here.

It is also recalled, as a reminder, that the general call periods, or "All Call Periods" in the usual terminology, form an integral part of the sequencing of the exchanges between the radar and the aircraft. They usually incorporate two types of "All Call" interrogations: an interrogation in "S mode only All Call" mode used for acquiring the new S mode aircraft entering into the radar coverage and an interrogation intended for "SSR only" aircraft for the surveillance of the non-S mode aircraft. In this respect, they are mentioned without further detail in FIG. 12.

On the other hand, the schematic layout in FIG. 12 details the Roll Call periods 92 for each azimuth AZ1 to AZ6 by representing the various transactions:

by target aircraft (A1, A2, A3),
by nature of transactions (ELS, EHS),
by nature (Interrogation, Response),
by channel of the antenna used for the transaction (Sum channel, Difference channel).

In FIG. 12, the transactions made possible by the implementation of the invention, transactions carried out by the Difference channel, are highlighted by a framed background.

It should be noted that the first and third variant embodiments of the transmission means 32 according to the invention offer the possibility of simultaneously transmitting over Sum and Difference. It is thus possible to transmit the same "All Call" interrogations over the 2 channels simultaneously and thus to increase the illumination time on the SSR and S Mode targets entering into the antenna lobe.

Thus, the increase in the number of All Call interrogations allows more types of SSR mode to be managed per antenna rotation and the responses from S mode aircraft to be better untangled by controlling them with a lower response rate (in accordance with the mode of operation known by the term "Probability Reply" or "PR").

Furthermore, it should also be noted that the first variant embodiment of the transmission means 32 according to the invention also offers the possibility of transmitting, simultaneously over the Sum and Difference channels, different interrogation messages. The possibilities of operation illustrated in FIG. 12 may be further increased by simultaneously transmitting an ELS interrogation over the Sum channel and an EHS interrogation over the Difference channel, which then allows two different aircraft to be interrogated at exactly the same moment, as long as they are sufficiently spaced out in azimuth. In this case, the ISLS interrogation of the channel control is common to both the Sum and Difference interrogations.

The implementation of such a variant again allows the number of selective ELS or EHS interrogations in the same "Roll Call" period to be increased thus permitting the reduction of the duration of the latter which is required when the antenna rotates at high speed.

Thus, for the given transaction period 92 such as that carried out when the antenna illuminates the azimuth AZ4, the radar can simultaneously sequence an EHS interrogation by the right-hand Difference channel 101 (Δ channel) with the aircraft 3 localized in the azimuth A3 which enters into the illumination of the radar, and an ELS interrogation by the Sum channel 91 (Σ channel) with the aircraft 1 localized in the azimuth A1 placed in the centre of the illumination of the radar.

The second illustrative example relates to the transactions in IFF mode, which mode is of interest to the military world and is applicable to the interrogations of military aircraft by a secondary surveillance radar configured for executing such exchanges. In this mode of operation, the operational need of secondary surveillance radar systems mainly consists, in view of the imposed increase in the speeds of rotation of the antennas, in maintaining or even increasing the illumination time so as to carry out transactions of longer duration with the interrogated military aircraft.

Figure 13:
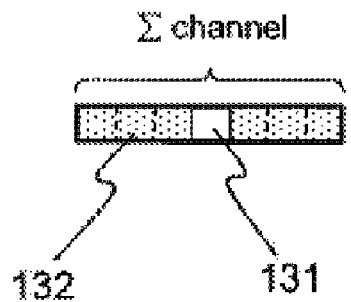
FIGS. 13 and 14, schematic layouts showing the sequencing of the interrogations carried out by a secondary surveillance radar in the current structure, in the case of an IFF identification request from a target detected by a primary radar.
Figure 14:
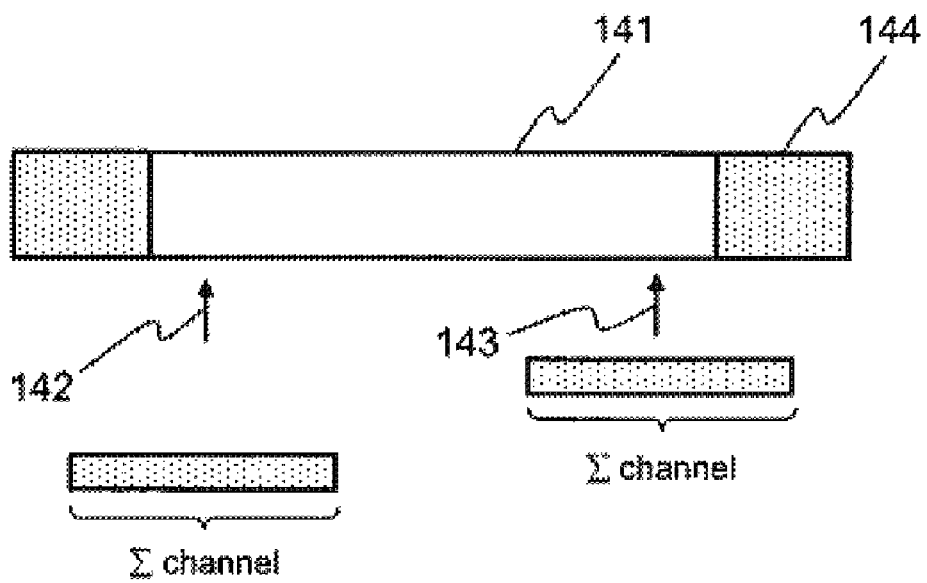

The schematic layouts in FIGS. 13 and 14 show the sequencing of the transactions effected by a current secondary surveillance radar, in other words the sequencing of the interrogations carried out by a secondary surveillance radar in the current structure, in the typical case of a designation carried out on a target, typically the case of request for IFF identification of a target detected by a primary radar.

Depending on the possible scenarios for trajectories of the target, of the aircraft, in question and on its distance to the secondary surveillance radar, the predicted position of the target is either known with precision as in the case of FIG. 13, the target being localized within a narrow prediction window 131, or with a high uncertainty, the target then being localized within a wide prediction window 141 as in the case of FIG. 14. In this latter case, the target can notably be positioned either at the start or at the end of the prediction window as illustrated by the arrows 142 and 143. As a result, the radar starts to interrogate the aircraft as soon as the diagram 132 of the Sum channel, the only channel utilized, intercepts the prediction window 131 or 141, in other words, when the azimuth of the axis of the antenna, which is also the centre of the diagram of the Sum channel, penetrates into a region 144 corresponding to the prediction window augmented by half of the diagram of the Sum channel. Then, as soon as the target is fully detected, the interrogation can cease.

Thus, as can be observed, the exploration of the prediction window is carried out by the single Sum channel. As a result, the number of responses needed to carry out an IFF transaction does not allow a current secondary surveillance radar, whose antenna rotates rapidly, to carry out an IFF identification at long range, with the required quality of jammer rejection.

Figure 15:
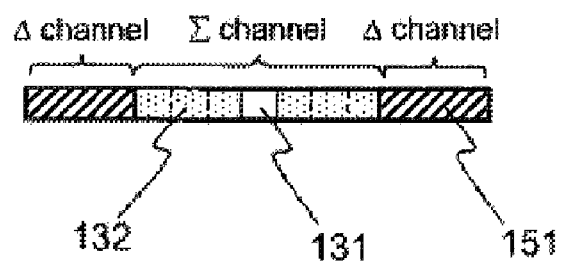
FIGS. 15 and 16, schematic layouts showing the sequencing of the interrogations carried out by a secondary surveillance radar according to the invention, in the case of an IFF identification request from a target detected by a primary radar.
Figure 16:
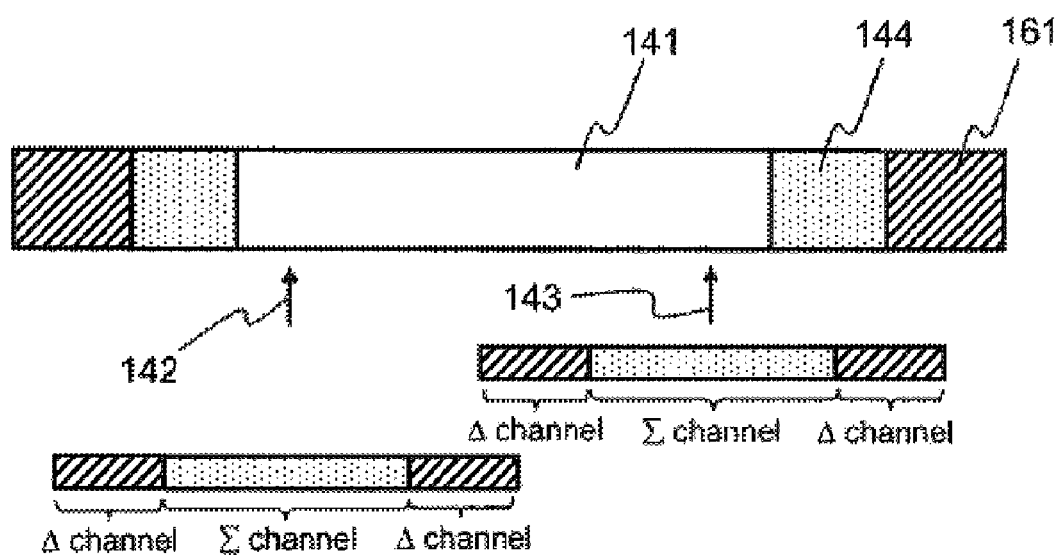

The schematic layouts in FIGS. 15 and 16 on the other hand show the sequencing of the transactions carried out by a secondary surveillance radar according to the invention, in the two cases, already illustrated in FIGS. 13 and 14, of a narrow prediction window 131 and of a wide window 141.

As before, the radar starts to interrogate the aircraft as soon as the antenna beam intercepts the prediction window. However, the antenna beam in question here is that corresponding to both the Sum and Difference channels. Consequently, the radar starts to interrogate the aircraft as soon as the antenna beam penetrates into the prediction window 131 or 141—in other words, when the azimuth of the axis of the antenna, which is also the centre of the diagram of the Sum channel, penetrates into a region corresponding to the prediction window augmented by half of the diagram of the channels Sum 132 or 144 and Difference 151 or 161. Then, as before, the interrogation ceases as soon as the target is fully detected.

Thus, when the axis of the antenna penetrates the region 151 (or 161) the interrogations are transmitted over the Difference channel. Then, starting from the moment where the axis of the antenna penetrates the region 132 or 144 and as long as the target is not detected, the interrogations are then transmitted over the Sum channel for the second variant embodiment of the transmission means 32 and simultaneously over the Sum and Difference channels for the first and third variant embodiments of the transmission means 32. When the target is finally detected, the interrogations are transmitted, as shown in FIG. 16, either over the Sum channel or over the Difference channel depending on the azimuth of the target which is then precisely known. The example of FIG. 16 shows the case of a target 143 at the start of the prediction window and another 142 at the end of the prediction window.

It should be noted that, as illustrated in FIGS. 15 and 16, whatever the size of the prediction window, the period of time during which it is possible to interrogate an aircraft and to receive its response, once precisely localized in azimuth, is thus very substantially lengthened, which makes it possible for a secondary surveillance radar according to the invention to effect an IFF identification at long range, of high quality, even for a high rotation speed of the antenna.

It should again be noted that, according to the invention, the Space-Time Management function 31 takes into account the measurements of the powers of the responses received over the Sum and Difference channels, which powers are measured by the means for processing the signal 14, in order to determine over which channel the transmission of the interrogations must be carried out at a given moment in order to take advantage of the maximum power radiated onto the target (interrogations by the Difference channel then by the Sum channel at the start of the window and vice versa by the Sum channel then by the Difference channel at the end of the window).

It should also be noted that, in the case of overlap between regions of designation for IFF interrogation, according to the variant embodiment of the transmission means used to implement the invention, it is possible to partially or fully manage such an overlap:

In the case of a secondary surveillance radar according to the invention, the processing of the overlaps is different depending on the variant embodiment in question.

With the second variant embodiment, illustrated in FIG. 7, at a given moment, the transmission of the interrogations is carried out either over the Sum channel or over the Difference channel. As a consequence, in the case of an overlap in azimuth, the interrogation to be transmitted over the Sum channel is given priority. However, this then partially brings back the processing of the overlapping targets to what is carried out in a current radar system not comprising the invention.

With the third variant embodiment, illustrated by FIG. 8, in the region of overlap, if the interrogations are of the same type, they can be transmitted over the Sum and Difference channels, with a power reduced by half for each channel, however.

With the first variant embodiment, illustrated in FIG. 6, for two separate predictive windows that overlap, the interrogations can be independently managed by simultaneously using the two transmission channels Sum and Difference, and also by advantageously disposing of a maximum power on each of the channels. Accordingly, the combinations of use of the Sum and Difference channels, summarized in Table 3, would then be the most common.

TABLE 3

Combinations of use of the Sum and Difference channels.

| Sum Channel | Difference Channel | COMMENTS | MODES UTILIZED |
|---|---|---|---|
| — | X | for predicted target detection starting entry into the beam | SSR, IFF, MS_EHS |
| X | X | for predicted target detection entering into the beam lobe centre | SSR, IFF, MS_EHS |
| X | — | for detection and localization of the target in the lobe centre | SSR, IFF, MS_EHS MS_ELS |
| X | X | for target detection exiting the beam centre lobe | SSR, IFF, MS_EHS |
| — | X | for target detection exiting the beam | SSR, IFF, MS_EHS |
| X | X | for detecting a target predicted with uncertainty in azimuth | SSR, IFF |

The invention claimed is:

1. A secondary surveillance radar, comprising:
an antenna having a sum channel, a difference channel, and a control channel;
a generator configured to generate sum channel interrogation messages, interrogator side-lobe suppression control channel interrogation messages, and difference channel interrogation messages;
a transmitter configured to transmit the sum channel interrogation messages using the sum channel, to transmit the interrogator side-lobe suppression control channel interrogation messages using the control channel, and to transmit the difference channel interrogation messages using the difference channel of the antenna;
a receiver configured to receive radio signals received by the sum channel, control channel, and difference channel of the antenna; and
a processor configured to process the radio signals received by the receiver,
wherein processor is further configured to detect aircraft responses on the radio signals received by the sum channel of the antenna, and to perform monopulse processing and side-lobe suppression processing on the aircraft responses using the radio signals received by the difference channel and the control channel of the antenna,
wherein the generator comprises a manager configured to manage the transmission of each interrogation message to a corresponding transmission channel of the antenna,
wherein the processor is further configured to detect responses from aircraft on the radio signals received by the difference channel of the antenna, and
wherein transactions between the secondary surveillance radar and the aircraft are carried out by the sum channel, by the difference channel, or by both the sum channel and the difference channel of the antenna based on the position of a target within a lobe of the antenna.

2. The radar according to claim 1, wherein:
the generator is further configured to simultaneously deliver two identical or separate interrogation messages to the transmitter, and
the transmitter comprises two separate transmission channels, one transmission channel transmitting one of the interrogation messages using the sum channel of the antenna and the other transmission channel transmitting the other interrogation message using the difference channel of the same antenna.

3. The radar according to claim 1, wherein:
the generator is further configured to alternately deliver sum channel interrogation messages and difference channel interrogation messages to the transmitter, and
the transmitter comprises a transformer configured to transform the interrogation message into a radio signal and a switch configured to direct the radio signal to the sum channel or the difference channel of the antenna based on the type of the interrogation message.

4. The radar according to claim 1, wherein:
the generator is further configured to deliver, alternately or simultaneously, identical sum channel interrogation messages and difference channel interrogation messages to the transmitter, and
the transmitter comprises a transformer configured to transform the interrogation message into a radio signal and a switch configured to direct the radio signal to the sum channel, the difference channel, or both the sum channel and the difference channel of the antenna.

* * * * *